(12) United States Patent
Bunnell et al.

(10) Patent No.: US 8,112,392 B1
(45) Date of Patent: Feb. 7, 2012

(54) METHODS AND SYSTEMS FOR CREATING SNAPSHOTS OF VIRTUALIZED APPLICATIONS

(75) Inventors: Karl Bunnell, Highland, UT (US); Randall R. Cook, Mapleton, UT (US); Jeremy Hurren, Pleasant Grove, UT (US)

(73) Assignee: Symantec Corporation, Mountain View, CA (US)

( * ) Notice: Subject to any disclaimer, the term of this patent is extended or adjusted under 35 U.S.C. 154(b) by 448 days.

(21) Appl. No.: 12/371,116

(22) Filed: Feb. 13, 2009

(51) Int. Cl.
*G06F 7/00* (2006.01)
(52) U.S. Cl. ........... 707/625; 707/639; 707/649; 718/1; 718/100; 709/201; 713/100
(58) Field of Classification Search .................. 707/639, 707/645, 649, 624, 625, 999.2; 718/1, 100; 709/224, 201; 713/100
See application file for complete search history.

(56) References Cited

U.S. PATENT DOCUMENTS

| | | | |
|---|---|---|---|
| 6,128,647 | A | 10/2000 | Haury |
| 7,117,495 | B2 | 10/2006 | Blaser et al. |
| 7,165,260 | B2 | 1/2007 | Blaser et al. |
| 7,945,897 | B1 | 5/2011 | Cook |
| 7,970,789 | B1 | 6/2011 | Blaser et al. |
| 7,971,049 | B2 * | 6/2011 | TeNgaio et al. ............ 713/1 |
| 2004/0260761 | A1 | 12/2004 | Leaute et al. |
| 2005/0091652 | A1 | 4/2005 | Ross et al. |
| 2005/0102396 | A1 * | 5/2005 | Hipp ........................... 709/224 |
| 2006/0010203 | A1 | 1/2006 | Mrsic-Flogel et al. |
| 2006/0236323 | A1 | 10/2006 | Neill et al. |
| 2007/0180450 | A1 | 8/2007 | Croft et al. |
| 2008/0034016 | A1 * | 2/2008 | Cisler et al. ................ 707/204 |
| 2008/0189700 | A1 * | 8/2008 | Schmidt et al. ................ 718/1 |
| 2008/0262832 | A1 * | 10/2008 | Kano ............................ 704/10 |
| 2008/0262833 | A1 * | 10/2008 | Kano et al. .................... 704/10 |
| 2008/0263101 | A1 * | 10/2008 | Hara ............................ 707/200 |
| 2008/0307000 | A1 * | 12/2008 | Paterson et al. ............ 707/104.1 |
| 2010/0037235 | A1 * | 2/2010 | Larimore et al. ............ 719/312 |
| 2010/0049929 | A1 * | 2/2010 | Nagarkar et al. ............ 711/162 |
| 2011/0061045 | A1 | 3/2011 | Phillips |

OTHER PUBLICATIONS

U.S. Appl. No. 12/369,512, filed Feb. 11, 2009, Bunnell, Karl.
"VMware ThinApp: Deploy and run applications without conflict"; (accessed May 14, 2009); http://www.vmware.com/files/pdf/thinapp_datasheet.pdf.
Randall R. Cook; Dynamic Insertion and Removal of Virtual Software Sub-Layers; U.S. Appl. No. 12/058,782, filed Mar. 31, 2008.
Non-Final Office Action received in related U.S. Appl. No. 12/058,782; Aug. 3, 2011.

(Continued)

*Primary Examiner* — Dennis Truong
(74) *Attorney, Agent, or Firm* — Advantedge Law Group

(57) ABSTRACT

A method may include identifying a virtualized application that has a read-only virtualization sublayer and a read-write virtualization sublayer. The read-only virtualization sublayer may represent a base state of the virtualized application and the read-write virtualization sublayer may be configured to store changes to the base state of the virtualized application. The method may also include determining a first difference between the read-only virtualization sublayer and the read-write virtualization sublayer at a first point in time and using the first difference between the read-only virtualization sublayer and the read-write virtualization sublayer to create a first snapshot that represents a state of the virtualized application at the first point in time. Various other methods, systems, and computer-readable media are also disclosed.

20 Claims, 10 Drawing Sheets

OTHER PUBLICATIONS

Jordan Sanderson; Methods and Systems for Activating and Deactivating Virtualization Layers; U.S. Appl. No. 12/414,170, filed Mar. 30, 2009.

Lance Tengaio; Distributed Application Virtualization; U.S. Appl. No. 12/142,549, filed Jun. 19, 2008.

* cited by examiner

METHODS AND SYSTEMS FOR CREATING SNAPSHOTS OF VIRTUALIZED APPLICATIONS

BACKGROUND

A user may want to return a software application to a previous state for many different reasons. For example, a software update for an application may cause undesirable results, such as degrading an application's performance, causing file compatibility issues, or even rendering an application unusable. In these and other situations, a user may have to reinstall and reconfigure an application to return the application to a previous state.

Various backup technologies may take snapshots of a system and may allow a user to return the system to a previous state. However, such backup technologies may not be optimized to return a specific application to a previous state. Other technologies may enable a user to take snapshots of an application image for the purpose of creating an application package, but such technologies may not provide backup and restoration functionality. Furthermore, traditional backup and snapshot technologies may not be optimized for some virtualization technologies and may not enable a user to efficiently and effectively return a virtualized application to a previous state.

SUMMARY

The instant disclosure is directed to methods and systems for creating snapshots of virtualized applications. In some embodiments, a snapshot module may determine the difference between a read-only virtualization layer and a read-write virtualization layer of a virtualized application and may use the difference to create a snapshot of the virtualized application. The snapshot may be stored as a backup for the virtualized application and/or may be deployed to other computing devices.

In some embodiments, the snapshot module may create a plurality of snapshots of the virtualized application. In such embodiments, a user may return the virtualized application to an application state represented by any snapshot in the plurality of snapshots. The virtualized application may be returned to a previous state by activating a virtualization layer that includes a snapshot that represents the previous state. These and other embodiments will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
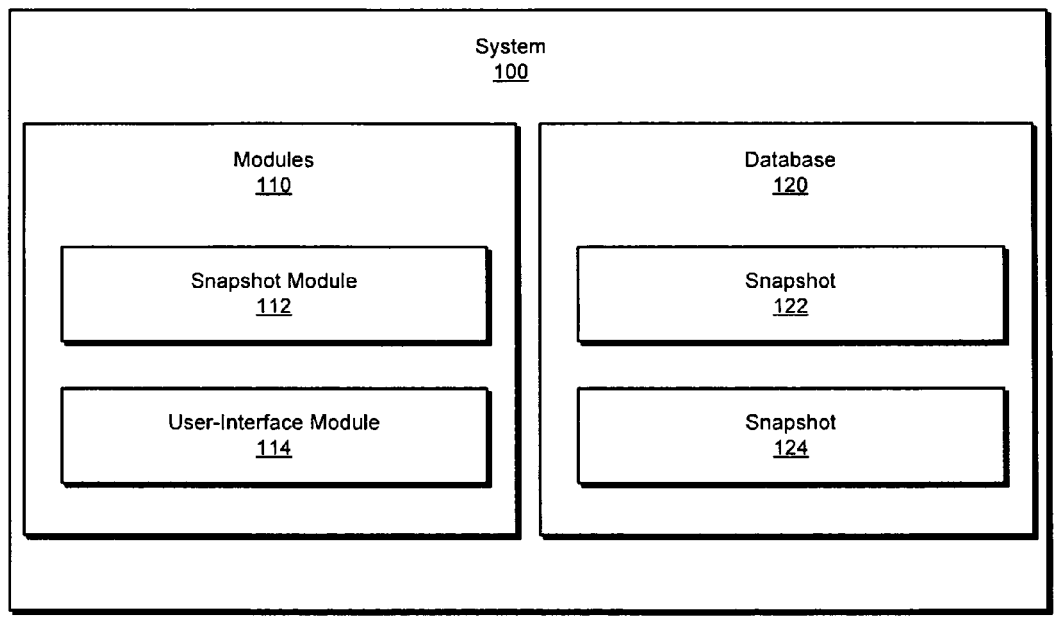
FIG. 1 is a block diagram of an exemplary system for creating snapshots of virtualized applications according to certain embodiments.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Embodiments of the present disclosure provide various methods and systems for creating snapshots of virtualized applications. Various embodiments may leverage the characteristics of virtualization technologies that provide read-only and read-write sublayers for virtualized applications. In such technologies, a read-only sublayer may provide a base state for a virtualized application and a read-write layer may capture changes to the base state. In some embodiments, the read-only layer of a virtualized application may be compared with the read-write layer of the virtualized application to create a snapshot. For example, a snapshot module may determine a difference between a read-only virtualization layer of an application and a read-write virtualization layer of the application. The snapshot module may use the difference between the read-only layer and the read-write layer to create a snapshot that represents a state of the virtualized application at a first point in time.

Embodiments of the present disclosure may provide various features and advantages not provided by traditional technologies. In some embodiments, comparing a read-only virtualization layer with a read-write virtualization layer may provide for quick and efficient snapshot creation. Furthermore, virtualized application snapshots disclosed herein may enable users to return a virtualized application to a previous state. These and other embodiments, features, advantages will be more fully understood upon reading the following detailed description in conjunction with the accompanying drawings and claims.

Figure 2:
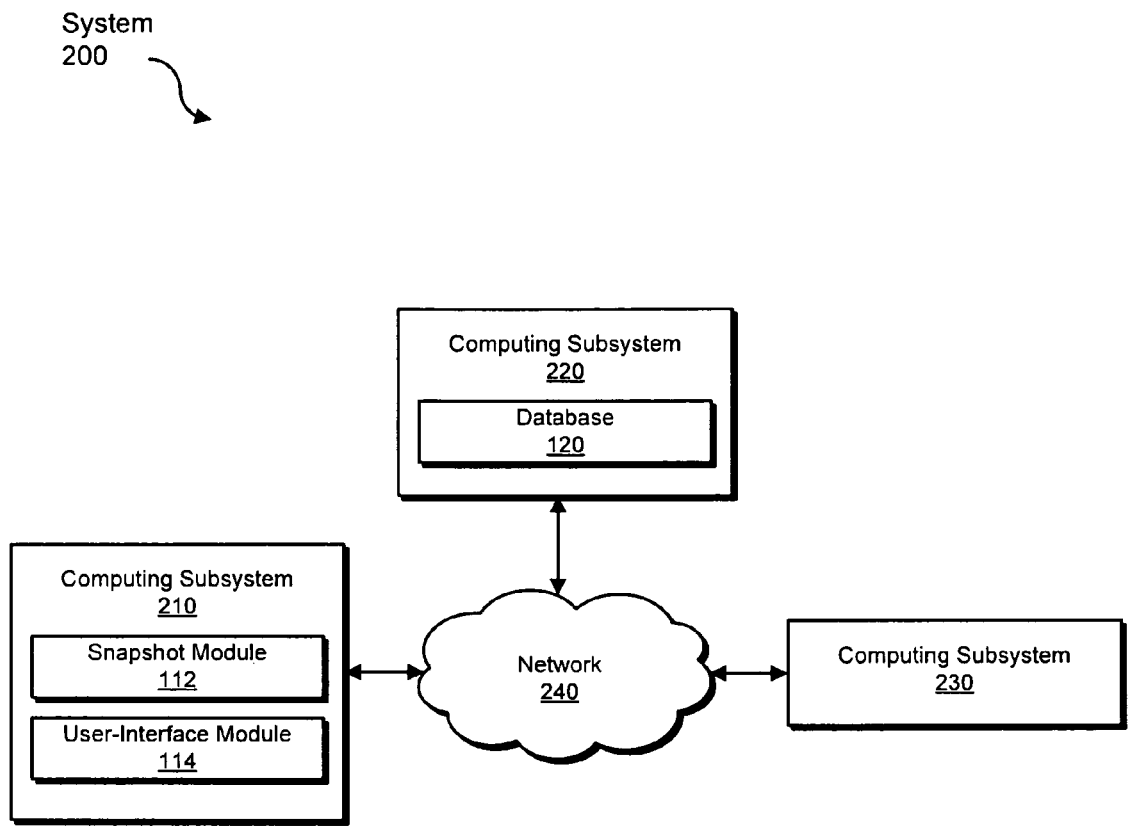
FIG. 2 is a block diagram of another exemplary system for creating snapshots of virtualized applications according to certain embodiments.
Figure 3:
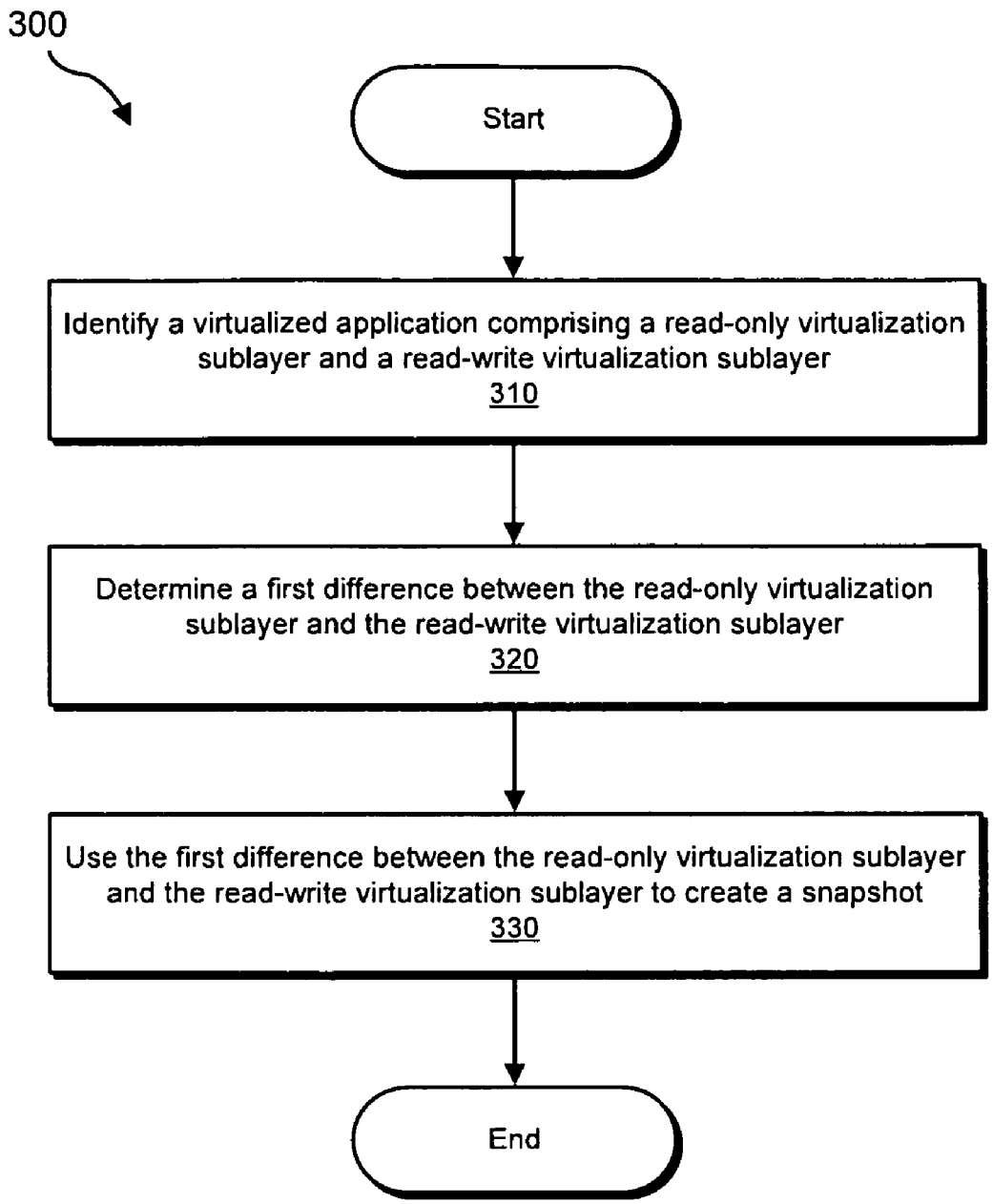
FIG. 3 is a flow diagram of an exemplary method for creating snapshots of virtualized applications according to certain embodiments.
Figure 4:
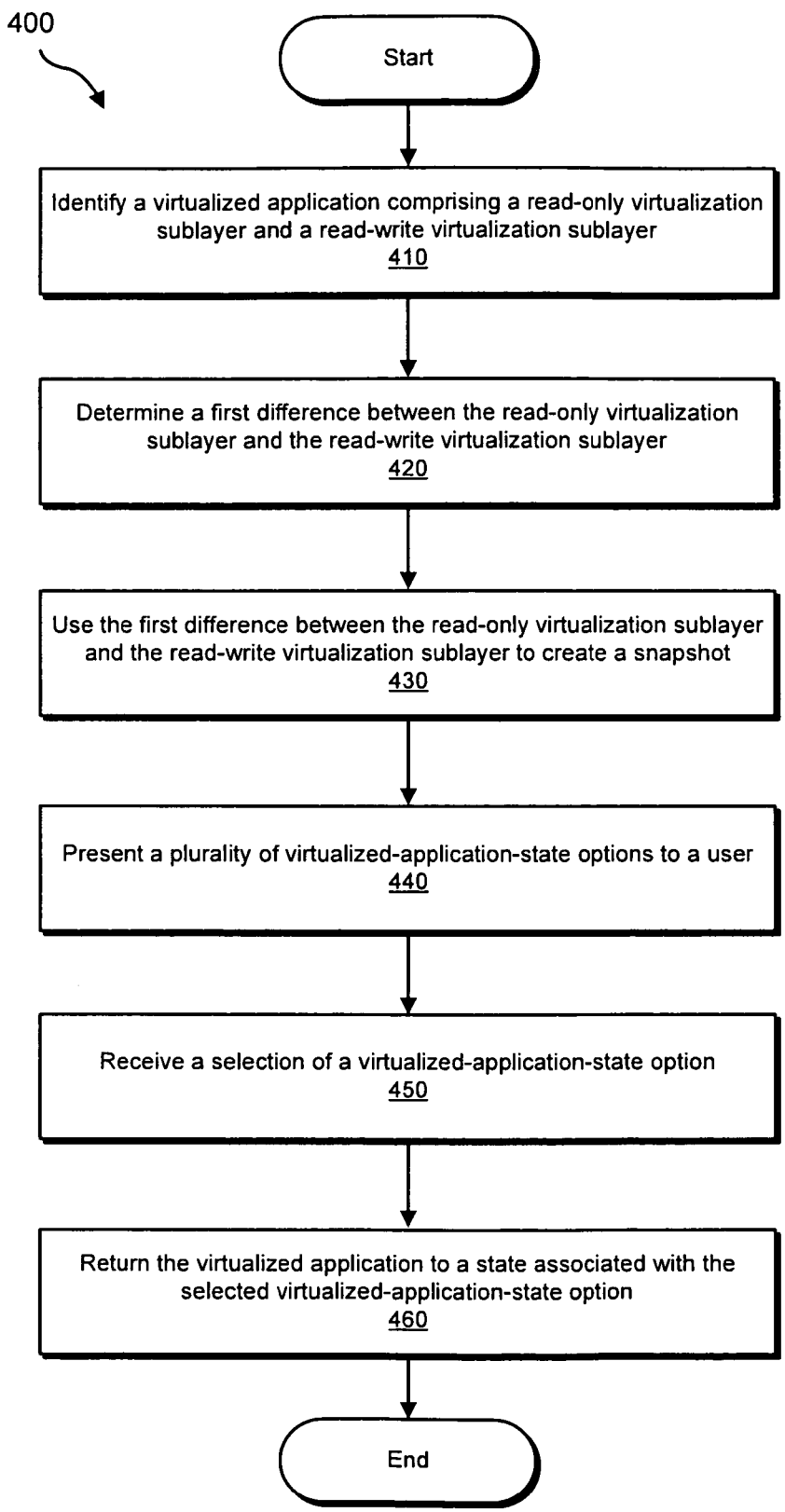
FIG. 4 is a flow diagram of another exemplary method for creating snapshots of virtualized applications according to certain embodiments.
Figure 9:
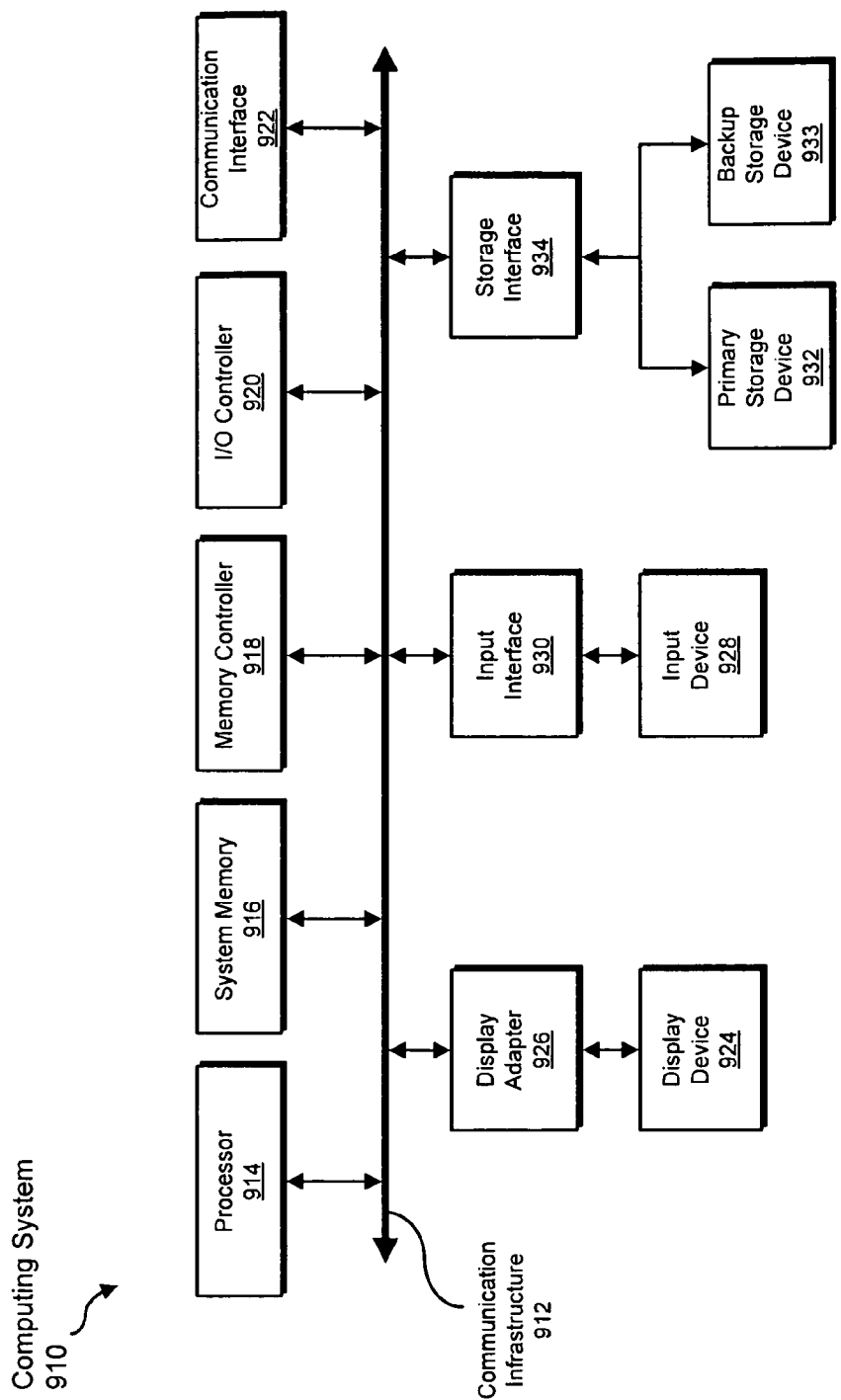
FIG. 9 is a block diagram of an exemplary computing system capable of implementing one or more of the embodiments described and/or illustrated herein.
Figure 10:
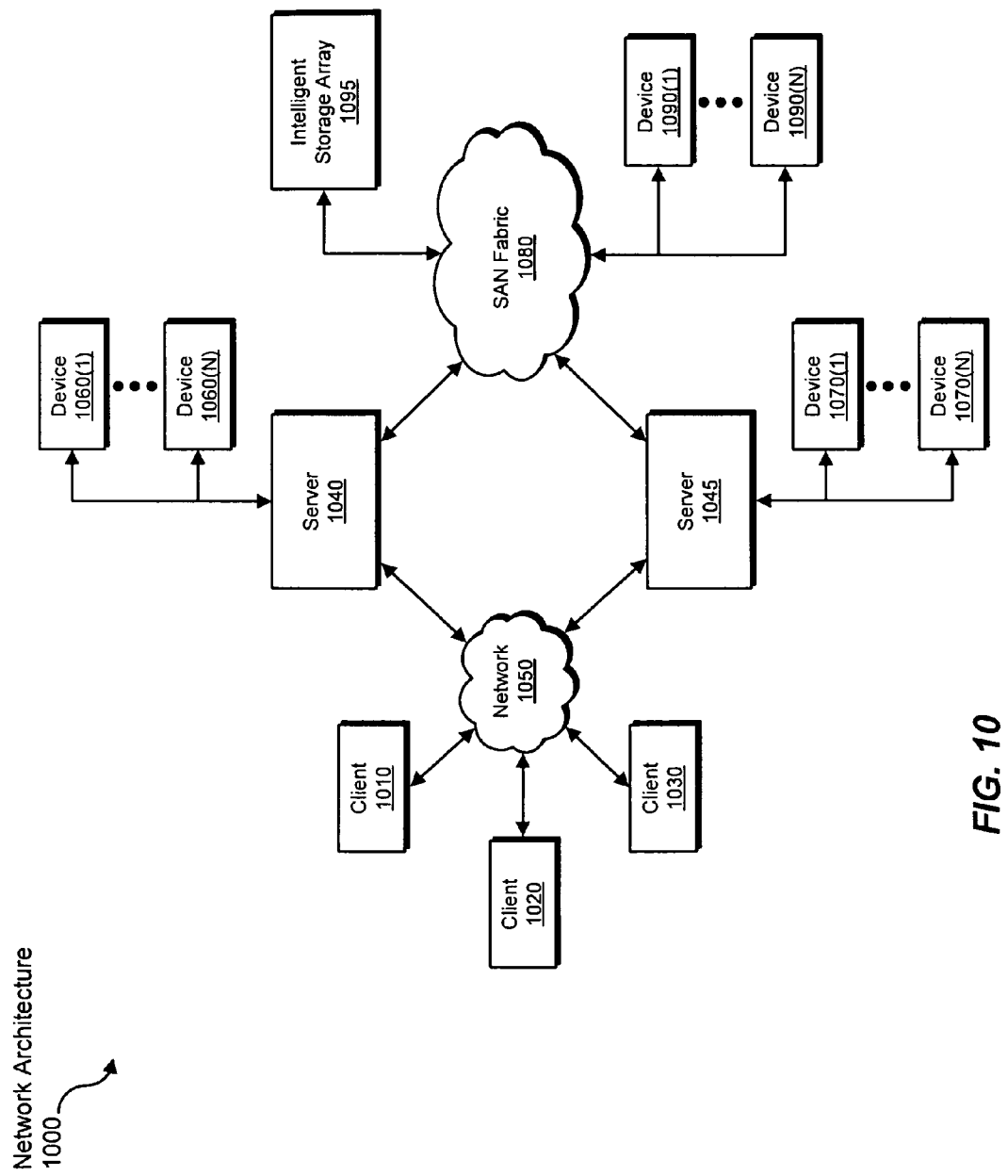
FIG. 10 is a block diagram of an exemplary computing network capable of implementing one or more of the embodiments described and/or illustrated herein.

FIGS. 1 and 2 show exemplary systems for creating snapshots for virtualized applications, and FIGS. 3 and 4 show methods for accomplishing the same. FIGS. 5-8 show various application layering technologies, and FIGS. 9 and 10 illustrate an exemplary computing system and network architecture for implementing embodiments of the instant disclosure.

FIG. 1 illustrates an exemplary system 100 for creating snapshots for virtualized applications. System 100 may include modules 110 and a database 120. Modules 110 may include a snapshot module 112 and a user-interface module 114. Snapshot module 112 may be programmed to identify a virtualized application, determine a difference between read-only and read-write virtualization layers of the virtualized application, and use the difference to create a snapshot. User-interface module 114 may be programmed to present a plurality of virtualized-application-state options to a user, receive a selection of a virtualized-application-state option, and return a virtualized application to a state associated with the selected virtualized-application-state option.

In certain embodiments, one or more of modules 110 in FIG. 1 may represent one or more software applications or programs that, when executed by a computing system, may cause the computing system to perform one or more steps disclosed herein. For example, as will be described in greater detail below, one or more of modules 110 may represent software modules configured to run on one or more computing devices, such as computing system 910 in FIG. 9 and/or portions of exemplary network architecture 1000 in FIG. 10. One or more of modules 110 in FIG. 1 may also represent all or portions of one or more special-purpose computers configured to perform one or more tasks associated with steps disclosed herein.

As previously mentioned, system 100 may also include a database 120. Database 120 may store snapshots of virtualized applications, such as snapshot 122 and snapshot 124. Database 120 may represent a portion of one or more computing devices. Database 120 may represent a portion of computing system 910 in FIG. 9 and/or portions of exemplary network architecture 1000 in FIG. 10. Database 120 may include any data structure capable of storing and/or organizing snapshots of virtualized applications.

FIG. 2 is a block diagram of an exemplary system 200 for creating snapshots of virtualized applications. Exemplary system 200 may include a computing subsystem 210, a computing subsystem 220, a computing subsystem 230, and a network 240. Computing subsystem 210 may include snapshot module 112 and user-interface module 114. Computing subsystem 220 may include database 120. Computing subsystems 210, 220, and 230 may include or be implemented as hardware, computing instructions (e.g., software), or a combination thereof. In some embodiments, one or more of computing subsystems 210, 220, and 230 may include a desktop computer, a laptop computer, a portable-computing device, a workstation, a server, and/or any other suitable computing device.

Computing subsystems 210, 220, and 230 may communicate over a network 240. Network 240 generally represents any medium or architecture capable of facilitating communications or data transfer. Network 240 may include, without limitation, the Internet, a Wide Area Network (WAN), a Local Area Network (LAN), a Personal Area Network (PAN), the Internet, Power Line Communications (PLC), a cellular network (e.g., a GSM network), or the like. Network 240 may facilitate communication or data transfer using wireless and/or wired communications.

FIG. 3 illustrates an exemplary method 300 for creating snapshots of virtualized applications. The steps in FIG. 3 may be performed by one or more components of system 100 and/or system 200. For example, at step 310 snapshot module 112 may identify a virtualized application. The virtualized application may include a read-only virtualization sublayer and a read-write virtualization sublayer.

A read-only sublayer, which is also referred to herein as a read-only virtualization sublayer, may include any sublayer that one or more users is prohibited from modifying. For example, a read-only sublayer may include a sublayer that may only be modified by an administrator. A read-only sublayer may provide a base state for an application installation. In contrast, a read-write sublayer may be configured to capture application changes made by users who are prohibited from modifying the read-only sublayer.

Snapshot module 112 may identify the virtualized application in any suitable manner. For example, snapshot module 112 may identify the virtualized application by locating it on a hard drive, receiving it from another module, and/or receiving it from a remote computing device.

At step 320, snapshot module 112 may determine a difference between the read-only virtualization sublayer of the virtualized application and the read-write virtualization sublayer of the virtualized application. Snapshot module 112 may determine the difference between the read-write and read-only sublayers in any suitable manner. For example, snapshot module 112 may determine the difference between the read-write and read-only sublayers by scanning the read-write and read-only sublayers to identify files in the sublayers. Snapshot module 112 may then compare files in the read-write sublayer with files in the read-only sublayer. In some embodiments, determining the difference between the read-write and read-only sublayers may include comparing a registry area in the read-write sublayer with a registry area in the read-only sublayer.

In some embodiments, snapshot module 112 may determine the difference between the read-write and read-only virtualization sublayers by creating a binary differential (i.e., a binary delta) between the read-write virtualization sublayer and the read-only virtualization sublayer. A binary differential between the read-write sublayer and the read-only sublayer may be created by generating the difference between registry and/or file system redirection areas associated with the read-only and read-write sublayers of the virtualized application.

After determining the difference between the read-only and read-write sublayers, at step 330 snapshot module 112 may use the difference to create a snapshot. Snapshot module 112 may create the snapshot in any suitable manner. In some embodiments, snapshot module 112 may use the difference between the read-only and read-write sublayers to create an archive or other backup of the virtualized application that represents a state of the virtualized application at the time of creation of the snapshot. For example, snapshot module 112 may create the snapshot by compressing the difference between the read-only sublayers into a Virtual Patch Archive (VPA). The snapshot may also be formatted and/or packaged using any other formatting and/or packaging technologies.

In some embodiments, snapshot module 112 may store the snapshot in database 120. Snapshot module 112 may store the snapshot with other snapshots of the virtualized application, which may include snapshots 122 and 124 in database 120. Database 120 may store snapshots of virtualized applications as backups of the virtualization application that may be used to return the virtualization application to a prior state. In some embodiments, database 120 may be stored locally (i.e., database 120 may be stored on computing subsystem 210). In other embodiments, database 120 may be stored remotely (i.e., database 120 may be stored on computing subsystem 220). If database 120 is stored remotely, snapshot module 112 may send snapshots to a remote computing system, such as computing subsystem 220, for storage.

In some embodiments, snapshot module 112 may deploy the snapshot to a remote computing device, such as computing subsystem 230. The snapshot may be deployed using any suitable deployment and/or transmission technologies. In such embodiments, instead of being used as a backup, the snapshot may be used to update or otherwise modify a virtualized application on a remote computing device to the application state represented by the snapshot.

FIG. 4 shows an exemplary method 400 for creating and using a snapshot for a virtualized application. The steps shown in FIG. 4 may be performed by any suitable computer-executable code and/or computing system. For example, at step 410, snapshot module 112 may identify a virtualized application. At step 420, snapshot module 112 may determine a difference between a read-only virtualization layer and a read-write virtualization layer of the virtualized application. At step 430, snapshot module 112 may use the difference between the read-only virtualization layer and the read-write virtualization layer to create a snapshot.

Steps 410-430 may be repeated any number of times to create additional snapshots. For example, steps 410-430 may be scheduled to be repeated periodically to create periodic backups of the virtualized application. Additionally or alternatively, steps 410-430 may be performed prior to an event that may alter the state of the virtualized application. For example, steps 410-430 may be performed before an update is applied to the virtualized application. In some embodiments, the snapshot process described in steps 410-430 may be performed automatically before an update is applied to the virtualized application. In other embodiments, the snapshot process described in steps 410-430 may be initiated manually before the update is applied to the virtualized application.

A user may interact with user-interface module 114 when the user wants to restore the virtualized application (i.e., return the virtualized application to a previous state). For example, when a user requests to return the virtualized application to a previous state, at step 440 user-interface module 114 may present a user with a plurality of virtualized-application-state options. Each option in the plurality of virtualized-application-state options may represent an option to select a snapshot of the virtualized application taken at a previous point in time. For example, the plurality of options may include a first option associated with a snapshot taken three days ago, a second option associated with a snapshot taken two days ago, and an third option associated with a snapshot taken one day ago.

The user may select a virtualized-application-state option, and at step 450 user-interface module 114 may receive the user's selection of the virtualized-application-state option. In response to receiving the user's selection, at step 460 user-interface module 114 may use a snapshot associated with the user's selection to return the virtualized application to a state associated with the selected virtualized-application-state option. As used herein, the phrase "virtualized-application state" may refer to the state of a virtualized application's files and/or settings at a particular point in time.

User-interface module 114 and/or snapshot module 112 may use a snapshot to return a virtualized application to a previous state in any suitable manner. In some embodiments, an active read-write layer of a virtualized application may be replaced with a snapshot to return the virtualized application to a state provided by the snapshot. In other embodiments, snapshot module 112 may establish the snapshot as a layer of the virtualized application. For example, snapshot module 112 may create a new, deactivated read-write virtualization layer, and the snapshot may be saved to the new read-write virtualization sublayer. In such embodiments, in order to return the virtualized application to a state associated with the snapshot, the read-write virtualization sublayer that includes the snapshot may be activated.

Figure 5:
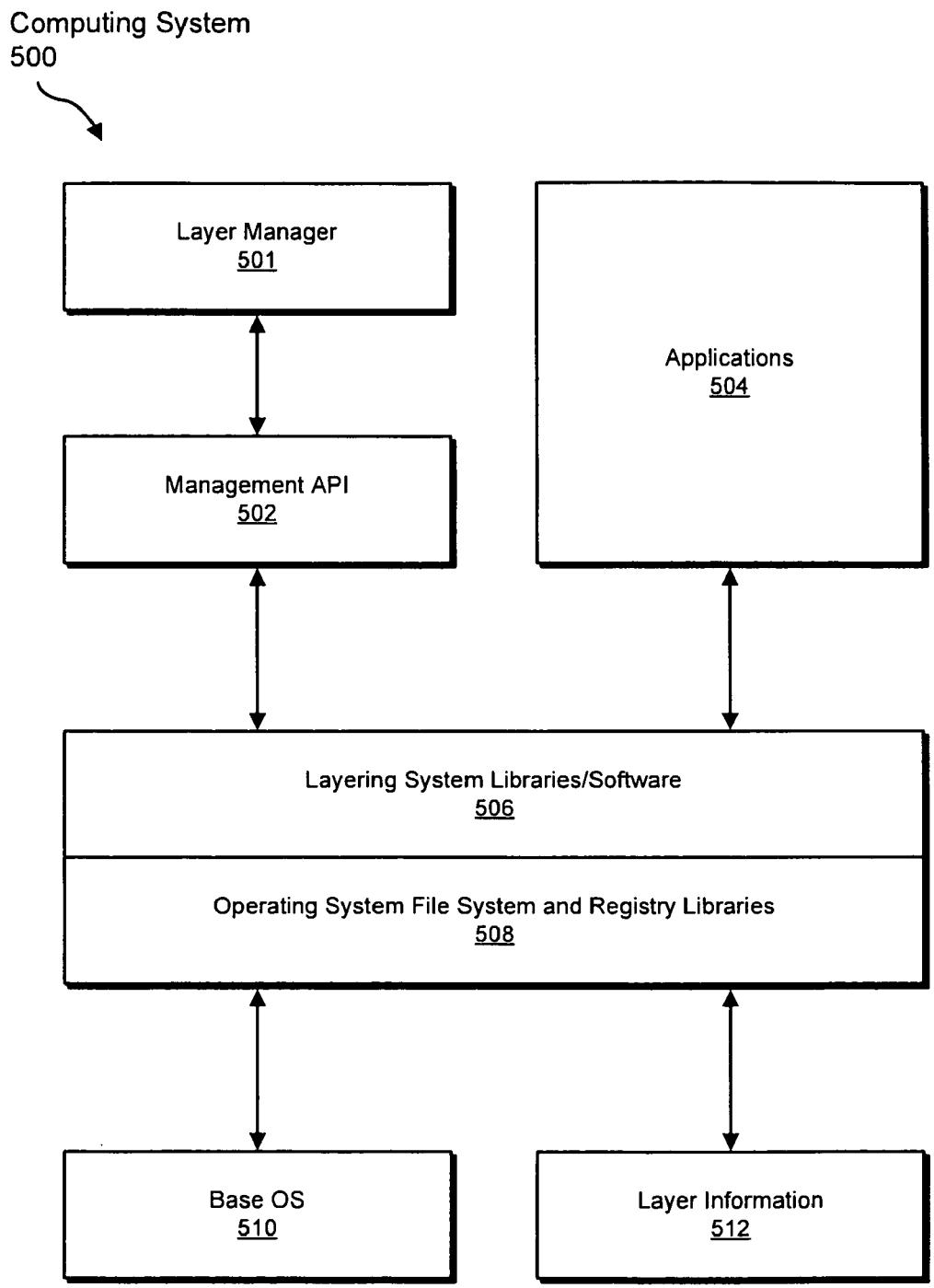
FIG. 5 is a block diagram of exemplary components of a conceptual level of a computing system configured to provide application virtualization according to certain embodiments.

FIGS. 5-8 provide examples of virtualization technologies and virtualized applications to which the snapshot creation embodiments described herein may be applied. FIG. 5 shows a conceptual organization of components of a computing system 500 with a virtualization layer. A base operating system 510 may form a platform with which applications may be executed and from which files may be accessed in file systems. Base operating system 510 may include registry settings, which may be globally available to applications for reading and writing. Computing system 500 may include libraries 508 for executing the functions of the operating system. Libraries 508 may include operating system files and registry entries. Layering system libraries and software 506 may be tied to libraries 508. Layering system libraries and software 506 may interpret file system and registry accesses from applications 504. The layering system software 506 may perform computations to determine whether the access should be permitted to continue to base operating system 510 or should be redirected to layer information 512. Layer information 512 may include information relating to the contents of files and registry settings. Layer manager 501 may control configuration of layering system software 506 through a management Application Programming Interface (API) 502.

As previously mentioned, in some application-virtualization technologies, each virtualization layer may include two sublayers: a read-only sublayer and a writable sublayer. An example of a virtualization technology that utilizes read-only and read-write sublayers is SYMANTEC's SOFTWARE VIRTUALIZATION SOLUTION (SVS).

A read-only sublayer may include an immutable base state of an application. In some embodiments, users may not— even unintentionally—make changes to the read-only sublayer. For example, in SVS, only administrators may be able to edit, update, and/or delete the contents of read-only sublayers. An application may be reset by deleting the existing read-only sublayer and replacing it with a new read-only sublayer.

A read-write (i.e., writeable) sublayer may capture changes to a base state of an application. For example, when a user alters an application by changing default preferences, these changes may be written to the read-write sublayer.

Virtualized applications that include read-only sublayers and read-write sublayers may be created in any suitable manner. For example, SVS may allow a user to specify a setup program for an application the user wants to capture for purposes of virtualizing the application. SVS may launch the setup program and capture all of the applications, files, and processes, including child processes and process-induced changes, in a single Virtual Software Package (VSP). SVS may also capture MICROSOFT installer (MSI) and service control manager changes. When the setup process is complete, SVS may automatically stop the capture process. An administrator may then edit the VSP to include settings that the administrator wants to distribute to users.

Figure 6:
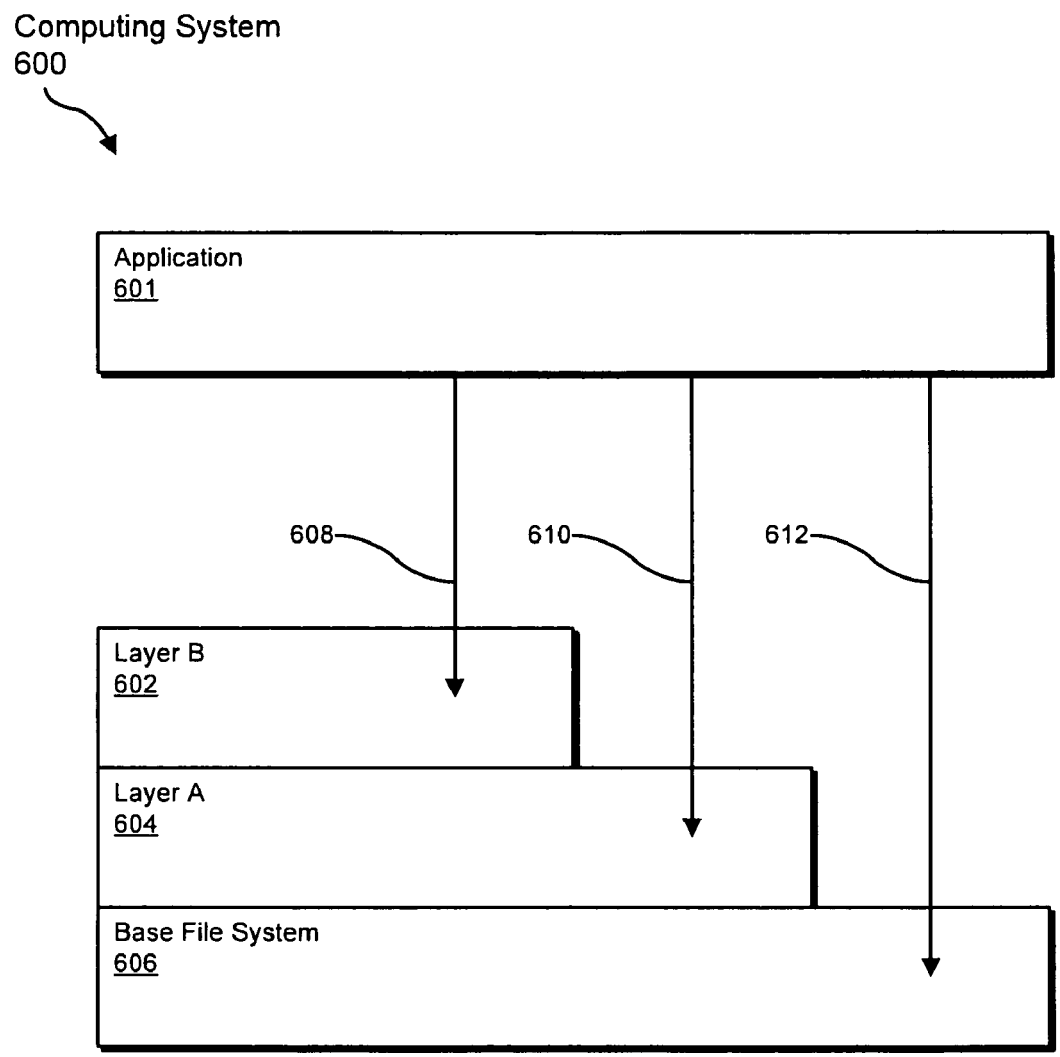
FIG. 6 is a block diagram showing virtualization layer prioritization according to certain embodiments.

FIG. 6 shows the operation of a computing system 600 with multiple virtualization layers. FIG. 6 illustrates an application 601, which may be a first and/or second version of an application. One or more files associated with application 601 may be located on virtualization layer B 602 and/or virtualization layer A 604. Virtualization layer B 602 may have priority over virtualization layer A 604, which in turn may have priority over a base file system 606. Application 601 may operate as follows. A first file access 608 may be made by application 601. A virtualization system may first search in layer B 602 for the requested file. Layer B 602 may include an entry for file access 608, and the corresponding file in layer B 602 may be returned to the application. Since layer B 602 has priority over layer A 604 and base file system 606, even if layer A 604 and base file system 606 have entries that correspond to file access 608, the virtualization system will return the entry from layer B 602.

Application 601 may make another file access 610. The virtualization system may not find a corresponding entry in layer B 602, but may find an entry in layer A 604. A third file access request 612 may not have a corresponding entry in layer B 602 or layer A 604, and the virtualization system may therefore return an entry from base file system 606.

Figure 7:
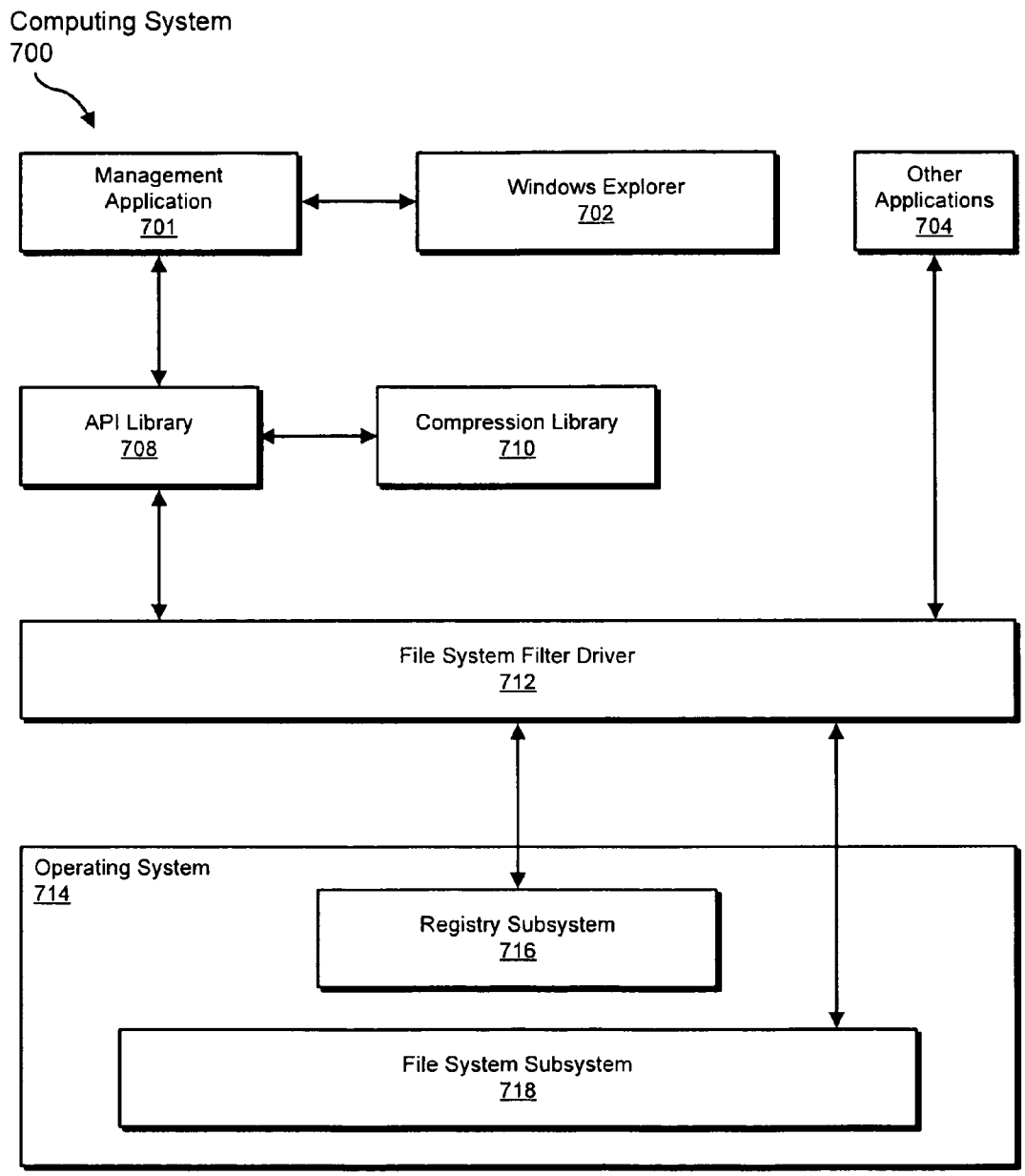
FIG. 7 is a block diagram of components of a computing system that includes virtualization layers according to certain embodiments.

FIG. 7 shows an example of a computing system 700 with a virtualization layer installed. The computing system may include an operating system 714. Operating system 714 may include a registry subsystem 716 and a file system subsystem 718. A file system filter driver 712 may be installed on operating system 714 and may have first processing priority for registry and file system accesses. A management application 701 may provide an administrator with an interface to interact with file system filter driver 712 and make changes to layers. An API library 708 may provide a convenient interface for management application 701 to interface with file system file driver 712.

Management application 701 may provide notices to a WINDOWS EXPLORER 702 indicating that the contents of a mounted file system have been changed. Other applications 704 may interact with the system, performing read and write operations to the file system and registry through file system filter driver 712. A compression library 710 may be provided to compress layer information.

File system filter driver 712 may store components of each layer and sublayer in one of two redirect areas (i.e. areas to which it redirects system calls). For example, file system filer driver 712 may store registry settings and attributes in a registry subsystem 716 and may store files in a file system subsystem 718.

In each sublayer's registry redirection area, file system filter driver 712 may store information about the state of the layer to which the sublayer belongs. File system filter driver 712 may also store references to the sublayer's file redirection area, reference counts, and sub-keys that—through a service control manager—may enable it to handle duplicate services running in multiple layers. In addition, file system filter driver 712 may store references to registry keys that contain user identity information, data-layer specifications, a sub-key for information about exclude entries, and a list of variables that govern the location of layer-specific files. As the name suggests, exclude entries may define application files and processes that a user may want to exclude from layers.

In the root of the file redirection area, file system filter driver 712 may store variable entries that abstract operating system specific file locations to enable users to deploy Virtual Software Archives (VSAs) on computers running various types of operating systems. When file system filter driver 712 is loaded on a user's computer, file system filter driver 712 may determine values for user and system variables.

File system filter driver 712 may store files that comprise sublayers and numbered folders under a file-redirection-area directory. File system filter driver 712 may use registry and file redirection areas to present an operating system—and by extension, applications and users—with an aggregate view of virtualized files and data.

For example, a user may launch WINDOWS EXPLORER to view the contents of a program file folder. The user's machine may be running a virtualized application, such as MOZILLA FIREFOX, and the FIREFOX layer may be active. File system filter driver 712 may intercept EXPLORER's calls to the file system. From the base, which may include all files, settings, and processes that do not reside in layers on the user's machine, file system filter driver 712 may gather a list of non-virtualized applications that reside in the program files folder. File system filter driver 712 may also redirect Explorer's calls to include FIREFOX, which would normally reside in the program files folder but which, in this case, resides in the file redirection area. File system filter driver 712 may then respond to EXPLORER's calls with a complete list of folders that the system expects to see in the program files directory, including FIREFOX. In this example, if the FIREFOX layer were deactivated, file system filter driver 712 would obscure its existence.

Figure 8:
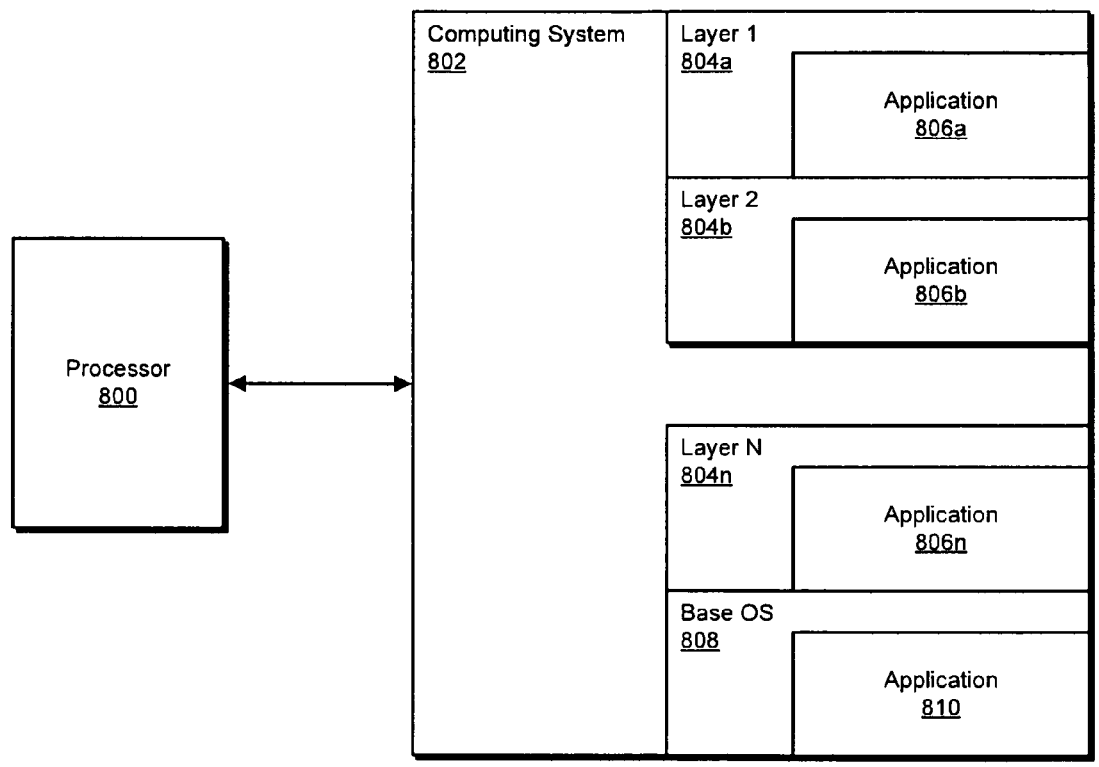
FIG. 8 is a block diagram showing organization of virtualization layers on a computing system according to certain embodiments.

FIG. 8 illustrates an example of a computing system 802 that includes virtualized applications 806a-n. Computing system 802 may contain a number of layers 804a-n. Applications 806a-n may be installed on layers 804a-n, respectively. As referred to herein, a layer (or virtualization layer) may refer to a set of file system and registry changes that may be managed by application virtualization software. In some embodiments, a layer may contain changes to one or more file systems but may not contain registry changes.

A layer may isolate an application from a base file system and may include files and a directory structure of the application's installation. The application files and directories may be shadowed or overlaid over the regular file system. Shared libraries (such as DLLs), system accessible configuration (such as registry entries), and version control may be managed by a layering subsystem.

Though each layer may be a separate and individual entity within a computing system, the application files, data, and system-accessible configuration may be presented as though they resided in their respective ordinary locations. Thus, an application stored in a layer may appear to the operating system of a computing system as if it had been installed using traditional installation techniques.

A software application installed in a virtualization layer may be an application in any commonly used meaning, including word processors, browsers, system tools, games, and the like, and the principles described herein may also extend to any other software installed on a computing system.

FIG. 9 is a block diagram of an exemplary computing system 910 capable of implementing one or more of the embodiments described and/or illustrated herein. Computing system 910 broadly represents any single or multi-processor computing device or system capable of executing computer-readable instructions. Examples of computing system 910 include, without limitation, workstations, laptops, client-side terminals, servers, distributed computing systems, handheld devices, or any other computing system or device. In its most basic configuration, computing system 910 may comprise at least one processor 914 and system memory 916.

Processor 914 generally represents any type or form of processing unit capable of processing data or interpreting and executing instructions. In certain embodiments, processor 914 may receive instructions from a software application or module. These instructions may cause processor 914 to perform the functions of one or more of the exemplary embodiments described and/or illustrated herein. For example, processor 914 may perform and/or be a means for performing, either alone or in combination with other elements, one or more of the identifying, determining, using, storing, deploying, generating, establishing, activating, presenting, receiving, and returning steps described herein. Processor 914 may also perform and/or be a means for performing any other steps, methods, or processes described and/or illustrated herein.

System memory 916 generally represents any type or form of volatile or non-volatile storage device or medium capable of storing data and/or other computer-readable instructions. Examples of system memory 916 include, without limitation, random access memory (RAM), read only memory (ROM), flash memory, or any other suitable memory device. Although not required, in certain embodiments computing system 910 may comprise both a volatile memory unit (such as, for example, system memory 916) and a non-volatile storage device (such as, for example, primary storage device 932, as described in detail below).

In certain embodiments, exemplary computing system 910 may also comprise one or more components or elements in addition to processor 914 and system memory 916. For example, as illustrated in FIG. 9, computing system 910 may comprise a memory controller 918, an Input/Output (I/O) controller 920, and a communication interface 922, each of which may be interconnected via a communication infrastructure 912. Communication infrastructure 912 generally represents any type or form of infrastructure capable of facilitating communication between one or more components of a computing device. Examples of communication infrastructure 912 include, without limitation, a communication bus (such as an ISA, PCI, PCIe, or similar bus) and a network.

Memory controller 918 generally represents any type or form of device capable of handling memory or data or controlling communication between one or more components of computing system 910. For example, in certain embodiments memory controller 918 may control communication between processor 914, system memory 916, and I/O controller 920 via communication infrastructure 912. In certain embodiments, memory controller 918 may perform and/or be a means for performing, either alone or in combination with other elements, one or more of the steps or features described and/or illustrated herein, such as identifying, determining, using, storing, deploying, generating, establishing, activating, presenting, receiving, and returning.

I/O controller 920 generally represents any type or form of module capable of coordinating and/or controlling the input and output functions of a computing device. For example, in certain embodiments I/O controller 920 may control or facilitate transfer of data between one or more elements of computing system 910, such as processor 914, system memory 916, communication interface 922, display adapter 926, input interface 930, and storage interface 934. I/O controller 920 may be used, for example, to perform and/or be a means for identifying, determining, using, storing, deploying, generating, establishing, activating, presenting, receiving, and returning steps described herein. I/O controller 920 may also be used to perform and/or be a means for performing other steps and features set forth in the instant disclosure.

Communication interface 922 broadly represents any type or form of communication device or adapter capable of facilitating communication between exemplary computing system 910 and one or more additional devices. For example, in certain embodiments communication interface 922 may facilitate communication between computing system 910 and a private or public network comprising additional computing systems. Examples of communication interface 922 include, without limitation, a wired network interface (such as a network interface card), a wireless network interface (such as a wireless network interface card), a modem, and any other suitable interface. In at least one embodiment, communication interface 922 may provide a direct connection to a remote server via a direct link to a network, such as the Internet. Communication interface 922 may also indirectly provide such a connection through, for example, a local area network (such as an Ethernet network or a wireless IEEE 802.11 network), a personal area network (such as a BLUETOOTH or IEEE Standard 802.15.1-2002 network), a telephone or cable network, a cellular telephone connection, a satellite data connection, or any other suitable connection.

In certain embodiments, communication interface 922 may also represent a host adapter configured to facilitate communication between computing system 910 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 922 may also allow computing system 910 to engage in distributed or remote computing. For example, communication interface 922 may receive instructions from a remote device or send instructions to a remote device for execution. In certain embodiments, communication interface 922 may perform and/or be a means for performing, either alone or in combination with other elements, one or more of the identifying, determining, using, storing, deploying, generating, establishing, activating, presenting, receiving, and returning steps disclosed herein. Communication interface 922 may also be used to perform and/or be a means for performing other steps and features set forth in the instant disclosure.

As illustrated in FIG. 9, computing system 910 may also comprise at least one display device 924 coupled to communication infrastructure 912 via a display adapter 926. Display device 924 generally represents any type or form of device capable of visually displaying information forwarded by display adapter 926. Similarly, display adapter 926 generally represents any type or form of device configured to forward graphics, text, and other data from communication infrastructure 912 (or from a frame buffer, as known in the art) for display on display device 924.

As illustrated in FIG. 9, exemplary computing system 910 may also comprise at least one input device 928 coupled to communication infrastructure 912 via an input interface 930. Input device 928 generally represents any type or form of input device capable of providing input, either computer or human generated, to exemplary computing system 910. Examples of input device 928 include, without limitation, a keyboard, a pointing device, a speech recognition device, or any other input device. In at least one embodiment, input device 928 may perform and/or be a means for performing, either alone or in combination with other elements, one or more of the identifying, determining, using, storing, deploying, generating, establishing, activating, presenting, receiving, and returning steps disclosed herein. Input device 928 may also be used to perform and/or be a means for performing other steps and features set forth in the instant disclosure.

As illustrated in FIG. 9, exemplary computing system 910 may also comprise a primary storage device 932 and a backup storage device 933 coupled to communication infrastructure 912 via a storage interface 934. Storage devices 932 and 933 generally represent any type or form of storage device or medium capable of storing data and/or other computer-readable instructions. For example, storage devices 932 and 933 may be a magnetic disk drive (e.g., a so-called hard drive), a floppy disk drive, a magnetic tape drive, an optical disk drive, a flash drive, or the like. Storage interface 934 generally represents any type or form of interface or device for transferring data between storage devices 932 and 933 and other components of computing system 910.

In certain embodiments, storage devices 932 and 933 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 932 and 933 may also comprise other similar structures or devices for allowing computer software, data, or other computer-readable instructions to be loaded into computing system 910. For example, storage devices 932 and 933 may be configured to read and write software, data, or other computer-readable information. Storage devices 932 and 933 may also be a part of computing system 910 or may be a separate device accessed through other interface systems.

Storage devices 932 and 933 may also be used, for example, to perform and/or be a means for performing, either alone or in combination with other elements, one or more of the identifying, determining, using, storing, deploying, generating, establishing, activating, presenting, receiving, and returning steps disclosed herein. Storage devices 932 and 933 may also be used to perform and/or be a means for performing other steps and features set forth in the instant disclosure.

Many other devices or subsystems may be connected to computing system 910. Conversely, all of the components and devices illustrated in FIG. 9 need not be present to practice the embodiments described and/or illustrated herein. The devices and subsystems referenced above may also be interconnected in different ways from that shown in FIG. 9. Computing system 910 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 910. All or a portion of the computer program stored on the computer-readable medium may then be stored in system memory 916 and/or various portions of storage devices 932 and 933. When executed by processor 914, a computer program loaded into computing system 910 may cause processor 914 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 910 may be configured as an application specific integrated circuit (ASIC) adapted to implement one or more of the exemplary embodiments disclosed herein.

FIG. 10 is a block diagram of an exemplary network architecture 1000 in which client systems 1010, 1020, and 1030 and servers 1040 and 1045 may be coupled to a network 1050. Client systems 1010, 1020, and 1030 generally represent any type or form of computing device or system, such as exemplary computing system 910 in FIG. 9. Similarly, servers 1040 and 1045 generally represent computing devices or systems, such as application servers or database servers, configured to provide various database services and/or to run certain software applications. Network 1050 generally represents any telecommunication or computer network; including, for example, an intranet, a wide area network (WAN), a local area network (LAN), a personal area network (PAN), or the Internet.

As illustrated in FIG. 10, one or more storage devices 1060(1)-(N) may be directly attached to server 1040. Similarly, one or more storage devices 1070(1)-(N) may be directly attached to server 1045. Storage devices 1060(1)-(N) and storage devices 1070(1)-(N) generally represent any type or form of storage device or medium capable of storing data and/or other computer-readable instructions. In certain embodiments, storage devices 1060(1)-(N) and storage devices 1070(1)-(N) may represent network-attached storage (NAS) devices configured to communicate with servers 1040 and 1045 using various protocols, such as NFS, SMB, or CIFS.

Servers 1040 and 1045 may also be connected to a storage area network (SAN) fabric 1080. SAN fabric 1080 generally represents any type or form of computer network or architecture capable of facilitating communication between a plurality of storage devices. SAN fabric 1080 may facilitate communication between servers 1040 and 1045 and a plurality of storage devices 1090(1)-(N) and/or an intelligent storage array 1095. SAN fabric 1080 may also facilitate, via network 1050 and servers 1040 and 1045, communication between client systems 1010, 1020, and 1030 and storage devices 1090(1)-(N) and/or intelligent storage array 1095 in such a manner that devices 1090(1)-(N) and array 1095 appear as locally attached devices to client systems 1010, 1020, and 1030. As with storage devices 1060(1)-(N) and storage devices 1070(1)-(N), storage devices 1090(1)-(N) and intelligent storage array 1095 generally represent any type or form of storage device or medium capable of storing data and/or other computer-readable instructions.

In certain embodiments, and with reference to exemplary computing system 910 of FIG. 9, a communication interface, such as communication interface 922 in FIG. 9, may be used to provide connectivity between each client system 1010, 1020, and 1030 and network 1050. Client systems 1010, 1020, and 1030 may be able to access information on server 1040 or 1045 using, for example, a web browser or other client software. Such software may allow client systems 1010, 1020, and 1030 to access data hosted by server 1040, server 1045, storage devices 1060(1)-(N), storage devices 1070(1)-(N), storage devices 1090(1)-(N), or intelligent storage array 1095. Although FIG. 10 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 1040, server 1045, storage devices 1060(1)-(N), storage devices 1070(1)-(N), storage devices 1090(1)-(N), intelligent storage array 1095, or any combination thereof. All or a portion of one or more of the exemplary embodiments disclosed herein may also be encoded as a computer program, stored in server 1040, run by server 1045, and distributed to client systems 1010, 1020, and 1030 over network 1050. Accordingly, network architecture 1000 may perform and/or be a means for performing, either alone or in combination with other elements, one or more of the identifying, determining, using, storing, deploying, generating, establishing, activating, presenting, receiving, and returning steps disclosed herein. Network architecture 1000 may also be used to perform and/or be a means for performing other steps and features set forth in the instant disclosure.

As detailed above, computing system 910 and/or one or more of the components of network architecture 1000 may perform and/or be a means for performing, either alone or in combination with other elements, one or more steps of the exemplary methods described and/or illustrated herein. For example, a computing system (e.g., computing system 910 and/or one or more of the components of network architecture 1000) may perform a computer-implemented method for creating snapshots of virtualized applications. The computing system may identify a virtualized application that has a read-only virtualization sublayer and a read-write virtualization sublayer. The read-only virtualization sublayer may include a base state of the virtualized application and the read-write virtualization layer may be configured to store changes to the base state of the virtualized application.

The computing system may determine a first difference between the read-only virtualization layer and the read-write virtualization layer at a first point in time and use the first difference between the read-only virtualization layer and the read-write virtualization layer to create a first snapshot that represents a state of the virtualized application at the first point in time. In some embodiments, the computing system may store the first snapshot as a backup of the virtualized application. In at least one embodiment, the computing system may deploy the first snapshot to a remote computing device.

According to various embodiments, the computing system may determine the first difference between the read-only virtualization layer and the read-write virtualization layer by generating a binary differential between the read-only virtualization layer and the read-write virtualization layer. In some embodiments, the computing system may determine a second difference between the read-only virtualization layer and the read-write virtualization layer at a second point in time and may store the second difference between the read-only virtualization layer and the read-write virtualization layer as a second snapshot of the virtualization application at the second point in time.

In certain embodiments, the computing system may establish the first snapshot as a layer of the virtualized application. The computing system may additionally or alternatively activate a virtualization layer that includes the first snapshot to return the virtualized application to the state of the virtualized application at the first point in time. In some embodiments, the computing system may present a plurality of virtualized-application-state options to a user. The plurality of virtualized-application-state options may include an option to select the first snapshot, and each option in the plurality of virtualized-application-state options may represent an option to select a snapshot of the virtualized application at a previous point in time. The computing system may receive a selection of a virtualized-application-state option and return the virtualized application to a state associated with the selected virtualized-application-state option.

In some embodiments, a system may include a snapshot module programmed to identify a virtualized application comprising a read-only virtualization sublayer and a read-write virtualization sublayer. The read-only virtualization sublayer may include a base state of the virtualized application and the read-write virtualization layer may be configured to store changes to the base state of the virtualized application. The snapshot module may also be programmed to determine a first difference between the read-only virtualization layer and the read-write virtualization layer at a first point in time. The snapshot module may be further programmed to use the first difference between the read-only virtualization layer and the read-write virtualization layer to create a first snapshot that represents a state of the virtualized application at the first point in time. The system may include a database configured to store the first snapshot and a processor configured to execute the snapshot module.

In some embodiments, the snapshot module may be programmed to generate a binary differential between the read-only virtualization layer and the read-write virtualization layer, determine a second difference between the read-only virtualization layer and the read-write virtualization layer at a second point in time, store the second difference between the read-only virtualization layer and the read-write virtualization layer as a second snapshot of the virtualization application at the second point in time, establish the first snapshot as a layer of the virtualized application, and/or activate the first snapshot to return the virtualized application to the state of the virtualized application at the first point in time.

In some embodiments, the system may include a user-interface module in communication with the snapshot module and programmed to present a plurality of virtualized-application-state options to a user. The plurality of virtualized-application-state options may include an option to select the first snapshot, and each option in the plurality of virtualized-application-state options may represent an option to select a snapshot of the virtualized application at a previous point in time. The user-interface module may also be programmed to receive a selection of a virtualized-application-state option and return the virtualized application to a state associated with the selected virtualized-application-state option.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments described herein. This exemplary description is not intended to be exhaustive or to be limited to any precise form disclosed. Many modifications and variations are possible without departing from the spirit and scope of the instant disclosure. It is desired that the embodiments described herein be considered in all respects illustrative and not restrictive and that reference be made to the appended claims and their equivalents for determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

We claim:

1. A computer-implemented method comprising:
   identifying a virtualized application comprising a read-only virtualization sublayer and a read-write virtualization sublayer, wherein:
   the read-only virtualization sublayer is configured such that at least one user is prohibited from modifying the read-only virtualization sublayer;
   the read-write virtualization sublayer is configured such that the at least one user is permitted to modify the read-write virtualization sublayer;
   the read-only virtualization sublayer comprises a base state of the virtualized application and the read-write virtualization sublayer is configured to store changes to the base state of the virtualized application;
   the read-only and read-write virtualization sublayers isolate the virtualized application from a base file system;
   the read-only and readwrite virtualization sublayers, when activated, overlay the base file system such that the virtualized application appears to an operating system as though it were installed in the base file system;
   determining a first difference between the read-only virtualization sublayer and the read-write virtualization sublayer at a first point in time;
   using the first difference between the read-only virtualization sublayer and the read-write virtualization sublayer to create a first snapshot that represents a state of the virtualized application at the first point in time.

2. The computer-implemented method of claim 1, further comprising storing the first snapshot as a backup of the virtualized application.

3. The computer-implemented method of claim 1, further comprising deploying the first snapshot to a remote computing device.

4. The computer-implemented method of claim 1, wherein determining the first difference between the read-only virtualization sublayer and the read-write virtualization sublayer comprises generating a binary differential between the read-only virtualization sublayer and the read-write virtualization sublayer.

5. The computer-implemented method of claim 1, further comprising:
   determining a second difference between the read-only virtualization sublayer and the read-write virtualization sublayer at a second point in time;
   using the second difference between the read-only virtualization sublayer and the read-write virtualization sublayer to create a second snapshot that represents a state of the virtualized application at the second point in time.

6. The computer-implemented method of claim 1, further comprising:
   creating a new virtualization layer associated with the virtualized application;
   saving the first snapshot to the new virtualization layer of the virtualized application.

7. The computer-implemented method of claim 6, further comprising activating the new virtualization layer to return the virtualized application to the state of the virtualized application at the first point in time.

8. The computer-implemented method of claim 1, further comprising:
   presenting a plurality of virtualized-application-state options to a user, wherein:
   the plurality of virtualized-application-state options includes an option to select the first snapshot;
   each option in the plurality of virtualized-application-state options represents an option to select a snapshot of the virtualized application at a previous point in time;
   receiving a selection of a virtualized-application-state option;
   returning the virtualized application to a state associated with the selected virtualized-application-state option.

9. A system comprising:
   a snapshot module programmed to:
   identify a virtualized application comprising a read-only virtualization sublayer and a read-write virtualization sublayer, wherein:
   the read-only virtualization sublayer is configured such that at least one user is prohibited from modifying the read-only virtualization sublayer;
   the read-write virtualization sublayer is configured such that the at least one user is permitted to modify the read-write virtualization sublayer;
   the read-only virtualization sublayer comprises a base state of the virtualized application and the read-write virtualization sublayer is configured to store changes to the base state of the virtualized application;
   the read-only and read-write virtualization sublayers isolate the virtualized application from a base file system;
   the read-only and read-write virtualization sublayers, when activated, overlay the base file system such that the virtualized application appears to an operating system as though it were installed in the base file system;
   determine a first difference between the read-only virtualization sublayer and the read-write virtualization sublayer at a first point in time;
   use the first difference between the read-only virtualization sublayer and the read-write virtualization sublayer to create a first snapshot that represents a state of the virtualized application at the first point in time;
   a database configured to store the first snapshot;
   a hardware processor configured to execute the snapshot module.

10. The system of claim 9, wherein the snapshot module is further programmed to generate a binary differential between the read-only virtualization sublayer and the read-write virtualization sublayer.

11. The system of claim 9, wherein the snapshot module is further programmed to:
- determine a second difference between the read-only virtualization sublayer and the read-write virtualization sublayer at a second point in time;
- store the second difference between the read-only virtualization layer and the read-write virtualization layer to the database as a second snapshot of the virtualized application.

12. The system of claim 9, wherein the snapshot module is further programmed to:
- create a new virtualization layer associated with the virtualized application;
- save the first snapshot to the new virtualization layer of the virtualized application.

13. The system of claim 12, wherein the snapshot module is further programmed to activate the new virtualization layer to return the virtualized application to the state of the virtualized application at the first point in time.

14. The system of claim 9, further comprising a user-interface module in communication with the snapshot module and programmed to:
- present a plurality of virtualized-application-state options to a user, wherein:
  - the plurality of virtualized-application-state options includes an option to select the first snapshot;
  - each option in the plurality of virtualized-application-state options represents an option to select a snapshot of the virtualized application at a previous point in time;
- receive a selection of a virtualized-application-state option;
- return the virtualized application to a state associated with the selected virtualized-application-state option.

15. A non-transitory computer-readable medium storing one or more computer-executable instructions that, when executed by a computing device, cause the computing device to:
- identify a virtualized application comprising a read-only virtualization sublayer and a read-write virtualization sublayer, wherein:
  - the read-only virtualization sublayer is configured such that at least one user is prohibited from modifying the read-only virtualization sublayer;
  - the read-write virtualization sublayer is configured such that the at least one user is permitted to modify the read-write virtualization sublayer;
  - the read-only virtualization sublayer comprises a base state of the virtualized application and the read-write virtualization sublayer is configured to store changes to the base state of the virtualized application;
  - the read-only and read-write virtualization sublayers isolate the virtualized application from a base file system;
  - the read-only and read-write virtualization sublayers, when activated, overlay the base file system such that the virtualized application appears to an operating system as though it were installed in the base file system;
- determine a first difference between the read-only virtualization sublayer and the read-write virtualization sublayer at a first point in time;
- use the first difference between the read-only virtualization sublayer and the read-write virtualization sublayer to create a first snapshot that represents a state of the virtualized application at the first point in time.

16. The non-transitory computer-readable medium of claim 15, wherein the one or more computer-executable instructions are programmed to cause the computing device to generate a binary differential between the read-only virtualization sublayer and the read-write virtualization sublayer.

17. The non-transitory computer-readable medium of claim 15, wherein the one or more computer-executable instructions are programmed to cause the computing device to:
- determine a second difference between the read-only virtualization sublayer and the read-write virtualization sublayer at a second point in time;
- use the second difference between the read-only virtualization sublayer and the read-write virtualization layer to create a second snapshot that represents a state of the virtualized application at the second point in time.

18. The non-transitory computer-readable medium of claim 15, wherein the one or more computer-executable instructions are programmed to cause the computing device to:
- create a new virtualization layer associated with the virtualized application;
- save the first snapshot to the new virtualization layer of the virtualized application.

19. The non-transitory computer-readable medium of claim 15, wherein the one or more computer-executable instructions are programmed to cause the computing device to activate the new virtualization layer to return the virtualized application to the state of the virtualized application at the first point in time.

20. The non-transitory computer-readable medium of claim 15, wherein the one or more computer-executable instructions are programmed to cause the computing device to:
- present a plurality of virtualized-application-state options to a user, wherein:
  - the plurality of virtualized-application-state options includes an option to select the first snapshot;
  - each option in the plurality of virtualized-application-state options represents an option to select a snapshot of the virtualized application at a previous point in time;
- receive a selection of a virtualized-application-state option;
- return the virtualized application to a state associated with the selected virtualized-application-state option.

* * * * *